(12) United States Patent
Hong et al.

(10) Patent No.: US 9,980,240 B2
(45) Date of Patent: May 22, 2018

(54) SCHEME FOR TRANSMITTING AND RECEIVING SYMBOLS IN FILTER BANK MULTI CARRIER SYSTEM

(71) Applicants: Samsung Electronics Co., Ltd., Suwon-si (KR); Industry-Academic Cooperation Foundation, Yonsei University, Seoul (KR)

(72) Inventors: Dae-Sik Hong, Seoul (KR); Won-Suk Chung, Seoul (KR); Beom-Ju Kim, Seoul (KR); Hyun-Kyu Yu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 90 days.

(21) Appl. No.: 14/742,926

(22) Filed: Jun. 18, 2015

(65) Prior Publication Data

US 2016/0007306 A1   Jan. 7, 2016

(30) Foreign Application Priority Data

Jun. 18, 2014   (KR) ........................ 10-2014-0074263

(51) Int. Cl.
*H04J 11/00* (2006.01)
*H04W 56/00* (2009.01)
*H04L 27/26* (2006.01)

(52) U.S. Cl.
CPC ....... *H04W 56/001* (2013.01); *H04L 27/2602* (2013.01)

(58) Field of Classification Search
CPC ........... H04W 56/004; H04W 56/0095; H04W 74/002

USPC ................. 370/203, 208, 211, 310, 328, 350
See application file for complete search history.

(56) References Cited

U.S. PATENT DOCUMENTS

| | | | | |
|---|---|---|---|---|
| 7,733,969 | B2* | 6/2010 | Zhang ................. | H04L 27/2613 375/260 |
| 8,687,720 | B2* | 4/2014 | Berg ..................... | H04L 25/022 375/259 |
| 9,210,000 | B2* | 12/2015 | Dore .................... | H04L 25/0204 |
| 9,401,740 | B2* | 7/2016 | Nair ...................... | H04B 1/707 |
| 2010/0183054 | A1 | 7/2010 | Daly et al. | |
| 2012/0243625 | A1 | 9/2012 | Berg | |
| 2015/0229364 | A1* | 8/2015 | Kim ...................... | H04J 11/003 370/329 |
| 2016/0094377 | A1* | 3/2016 | Chen .................... | H04L 5/0053 370/350 |

(Continued)

OTHER PUBLICATIONS

M. Bellanger, et. al., "FBMC physical layer : a primer", PHYDYAS Deliverable, Jun. 25, 2010.

(Continued)

*Primary Examiner* — Dmitry H Levitan
(74) *Attorney, Agent, or Firm* — McAndrews, Held & Malloy, Ltd.

(57) ABSTRACT

Provided is a method for transmitting a transmission symbol in a transmitting device supporting a filter bank multi carrier (FBMC) scheme. The method includes generating a training symbol by including a training signal in at least one of an odd symbol and an even symbol constituting the training symbol; generating the transmission symbol by delay-overlapping the training symbol and at least one data symbol; and transmitting the transmission symbol.

12 Claims, 11 Drawing Sheets

(56) References Cited

U.S. PATENT DOCUMENTS

2016/0099822 A1\* 4/2016 Thein ................... H04L 5/0051
375/260
2016/0211999 A1\* 7/2016 Wild ..................... H04L 27/264

OTHER PUBLICATIONS

T. M. Schmidl and D. C. Cox, "Robust frequency and timing synchronization for OFDM", IEEE Transactions on Communications, pp. 1613-1621, Dec. 15, 1997.
M. Tanda, et al., "Data-Aided Synchronization and Initialization", PHYDYAS Deliverables, Jul. 22, 2008.

\* cited by examiner

SCHEME FOR TRANSMITTING AND RECEIVING SYMBOLS IN FILTER BANK MULTI CARRIER SYSTEM

CROSS-REFERENCE TO RELATED APPLICATION(S)

This application claims the benefit under 35 U.S.C. § 119(a) of a Korean patent application filed in the Korean Intellectual Property Office on Jun. 18, 2014 and assigned Serial No. 10-2014-0074263, the entire disclosure of which is incorporated herein by reference.

TECHNICAL FIELD

The present disclosure relates to a scheme for transmitting and receiving symbols in a filter bank multi carrier (FBMC) system, and more particularly, to a method in which a transmitting device or a receiving device uses transmission symbols for synchronization and an apparatus therefor.

BACKGROUND

To meet the demand for wireless data traffic having increased since deployment of 4G communication systems, efforts have been made to develop an improved 5G or a pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In an orthogonal frequency division multiplexing (OFDM) system, one of synchronization operating schemes may be a scheme of operating synchronization by generating a training symbol of a repeating pattern.

FIG. 1 illustrates an example of a synchronization operating scheme in an OFDM system. In the synchronization operating scheme of FIG. 1, a transmitter (or a transmitting side) may transmit at least one training symbol 110 between data symbols 120 and 130. One training symbol may include a sequence of one or more training signals. In other words, a training symbol may be expressed as a training signal sequence, and two or more arbitrary training signals (e.g., 100 and 102) included in each training symbol may have a correlation 104 with each other. That is, the at least one training symbol 110 may have the characteristic (e.g., a repeating pattern) that there are correlations 104, 106 and 108 between training signals.

A receiver (or a receiving side) may receive the training symbol 110, and synchronize by identifying the correlations 104, 106 and 108 between training signals constituting the training symbol 110. For example, the receiver may synchronize by using the correlation 104 between the training signal 100 and another training signal 102 included in the at least one training symbol 110 among the training symbols transmitted from the transmitter.

However, a system that cannot allocate separate time resources (e.g., time resources for the training symbol 110) for synchronization, or cannot generate the training symbol 110 of a repeating pattern (e.g., a repeating pattern in which training signals have a uniform magnitude such as the correlations 104, 106 and 108), may not employ the synchronization operating scheme of the OFDM system.

For example, the FBMC system is a scheme of overlap-transmitting (or transmitting in an overlapping manner) symbols that are generated by multiplying two or more signals by different filter coefficients through a filtering process. A FBMC system, however, may not employ the synchronization operating scheme of the OFDM system, since the FBMC system has difficulty in satisfying the above two conditions. The FBMC system may have the characteristics that the FBMC system is robust against the time delay through a filter, and may transmit a signal having a low magnitude of a sidelobe. The FBMC system has not attracted attention since the FBMC system is complex compared with the OFDM system.

The above information is presented as background information only to assist with an understanding of the present disclosure. No determination has been made, and no assertion is made, as to whether any of the above might be applicable as prior art with regard to the present disclosure.

SUMMARY

The present disclosure relates to a pre-5th-Generation (5G) or a 5G communication system to be provided for supporting higher data rates Beyond 4th-Generation (4G) communication system such as Long Term Evolution (LTE).

An aspect of the present disclosure is to address at least the above-mentioned problems and/or disadvantages and to provide at least the advantages described below. Accordingly, an aspect of the present disclosure is to provide a windowing method and a mirror filtering device capable of detecting a repeating signal waveform using one symbol in an FBMC system.

Another aspect of the present disclosure is to provide a synchronization operating method and apparatus for ensuring similar performance to the synchronization performance of an OFDM system without using a plurality of training symbols in an FBMC system.

In accordance with an aspect of the present disclosure, there is provided a method for transmitting a transmission symbol in a transmitting device supporting a filter bank multi carrier (FBMC) scheme. The method includes generating a training symbol by including a training signal in at least one of an odd symbol and an even symbol constituting the training symbol; generating the transmission symbol by delay-overlapping the training symbol and at least one data symbol; and transmitting the transmission symbol.

In accordance with another aspect of the present disclosure, there is provided a synchronization method that uses a transmission symbol in a receiving device supporting a filter bank multi carrier (FBMC) scheme. The synchronization method includes receiving the transmission symbol including one training symbol; selecting, as a training interval, two signal blocks among a plurality of signal blocks constituting the transmission symbol; and determining a synchronization point by calculating a correlation between training signals included in the training interval, and performing synchronization using the determined synchronization point. The training signal is included in at least one of an odd symbol and an even symbol constituting the one training symbol.

In accordance with further another aspect of the present disclosure, there is provided a transmitting device supporting a filter bank multi carrier (FBMC) scheme to transmit a transmission symbol. The transmitting device is configured to generate a training symbol by including a training signal in at least one of an odd symbol and an even symbol constituting the training symbol; generate the transmission symbol by delay-overlapping the training symbol and at least one data symbol; and transmit the transmission symbol.

In accordance with yet another aspect of the present disclosure, there is provided a receiving device supporting a filter bank multi carrier (FBMC) scheme to receive a transmission symbol and use the transmission symbol for synchronization. The receiving device is configured to receive the transmission symbol including at least one training symbol; select, as a training interval, two signal blocks among a plurality of signal blocks constituting the transmission symbol; and determine a synchronization point by calculating a correlation between training signals included in the training interval, and perform synchronization using the determined synchronization point. The training signal is included in at least one of an odd symbol and an even symbol constituting the at least one training symbol.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

Prior to a detailed description of the present disclosure, examples of interpretable meaning for some terms used herein will be presented. However, it should be noted that the terms are not limited to examples of the interpretation presented below.

In the present disclosure, the data that a transmitter desires to transmit to a receiver may be expressed as a signal or a symbol in terms of hardware.

Transmission symbols transmitted between the transmitter and the receiver may include data symbols and training symbols. The number of the transmission symbols may be one or more. The training symbol, which is a symbol used to synchronize by the transmitter and the receiver, may refer to a symbol that includes a training signal sequence. The data symbol, which is a symbol including the actual content information that the transmitter desires to send to the receiver, may refer to a symbol that includes a signal other than the training signal.

In the present disclosure, the training symbol may also be referred to as a synchronization symbol, a synchronization estimation symbol, or FBMC symbol (in the FBMC system). An FBMC filter may be used to represent the common characteristics of two filters (e.g., an even filter and an odd filter) used in the FBMC system. The term 'signal block' may be interchangeably used with the term 'interval', and the terms 'signal block' and 'interval' mean a period that is divided by a predetermined unit (e.g., a unit corresponding to one symbol) in the time domain.

Figure 1:
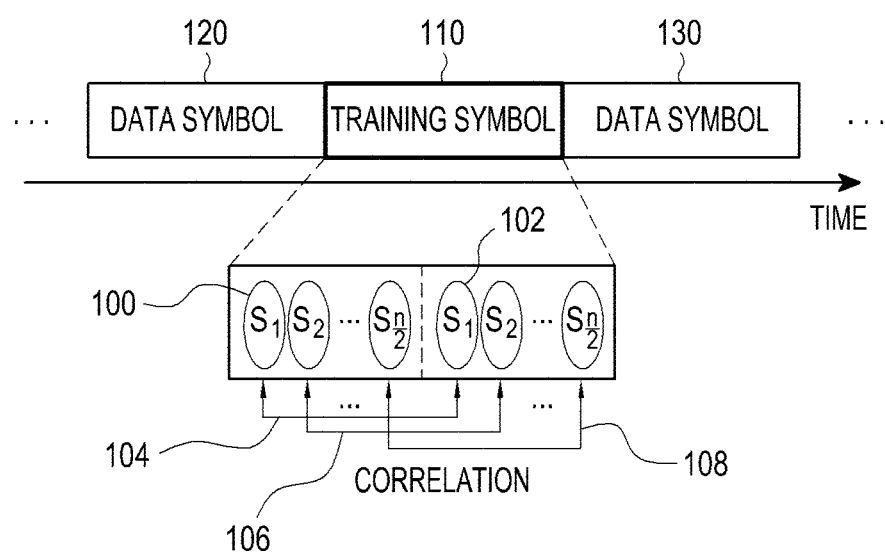
FIG. 1 illustrates an example of a synchronization operating scheme in an OFDM system.
Figure 2:
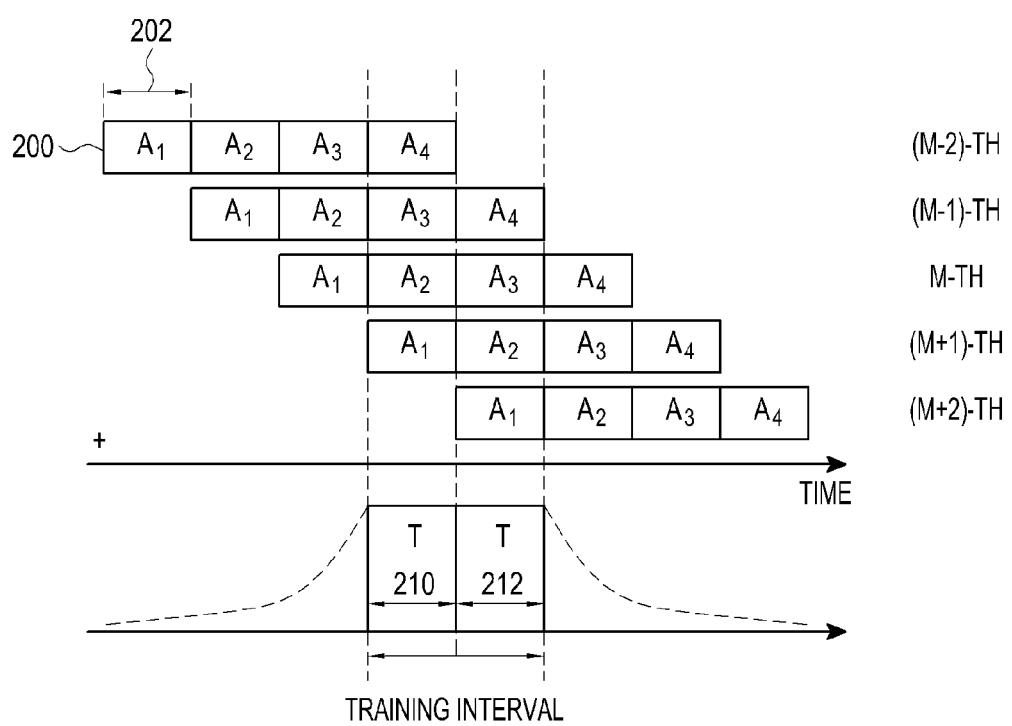
FIG. 2 illustrates an example of a synchronization operating scheme in an FBMC system.

FIG. 2 illustrates an example of a synchronization operating scheme in an FBMC system. In the synchronization operating scheme of the FBMC system, transmission symbols may be used, which are generated by delaying the same symbols 200 during a predetermined interval and repeatedly outputting the delayed symbols. In the following description, the operation of overlapping symbols by delaying symbols and repeatedly outputting the delayed symbols will be referred to as an 'operation of delay-overlapping symbols'.

FIG. 2 illustrates an operation of delay-overlapping transmission symbols by delaying the same symbols 200 during an interval corresponding to one symbol length 202 each time the same symbols 200 are output. In other words, until the output of (M−1)-th symbols is started after the output of (M−2)-th symbols is started, a delay corresponding to one symbol length 202 may occur, and until the output of M-th symbols is started after the output of (M−1)-th symbols is started, a delay corresponding to the one symbol length 202 may occur. Although for the convenience of understanding, the same symbols that are delayed-output are illustrated in FIG. 2 by being spread on the Y-axis as if the same symbols are not overlapped, it may be construed that the same symbols that are delayed-output are overlapped on the same plane.

The transmission symbols that are delay-overlapped in this way may include training parts (or training intervals) 210 and 212 having a repeating pattern. The training interval 210 may be a signal interval, in which a signal block A4 of the (M−2)-th symbol, a signal block A3 of the (M−1)-th symbol, a signal block A2 of the M-th symbol, and a signal block A1 of the (M+1)-th symbol are summed. In addition, the training interval 212 may be a signal interval, in which a signal block A4 of the (M−1)-th symbol, a signal block A3 of the M-th symbol, a signal block A2 of the (M+1)-th symbol, and a signal block A1 of the (M+2)-th symbol are summed.

The receiver may use the training intervals 210 and 212, for synchronization operating. If the training interval of a repeating pattern occurs, the FBMC system may also employ the synchronization operating method that the OFDM system has used to operate synchronization.

The synchronization operating scheme of the FBMC system may use a plurality of symbols since symbols are overlap-transmitted to form a training interval of a repeating pattern, causing a reduction in the efficiency of time and frequency resources.

Figure 3:
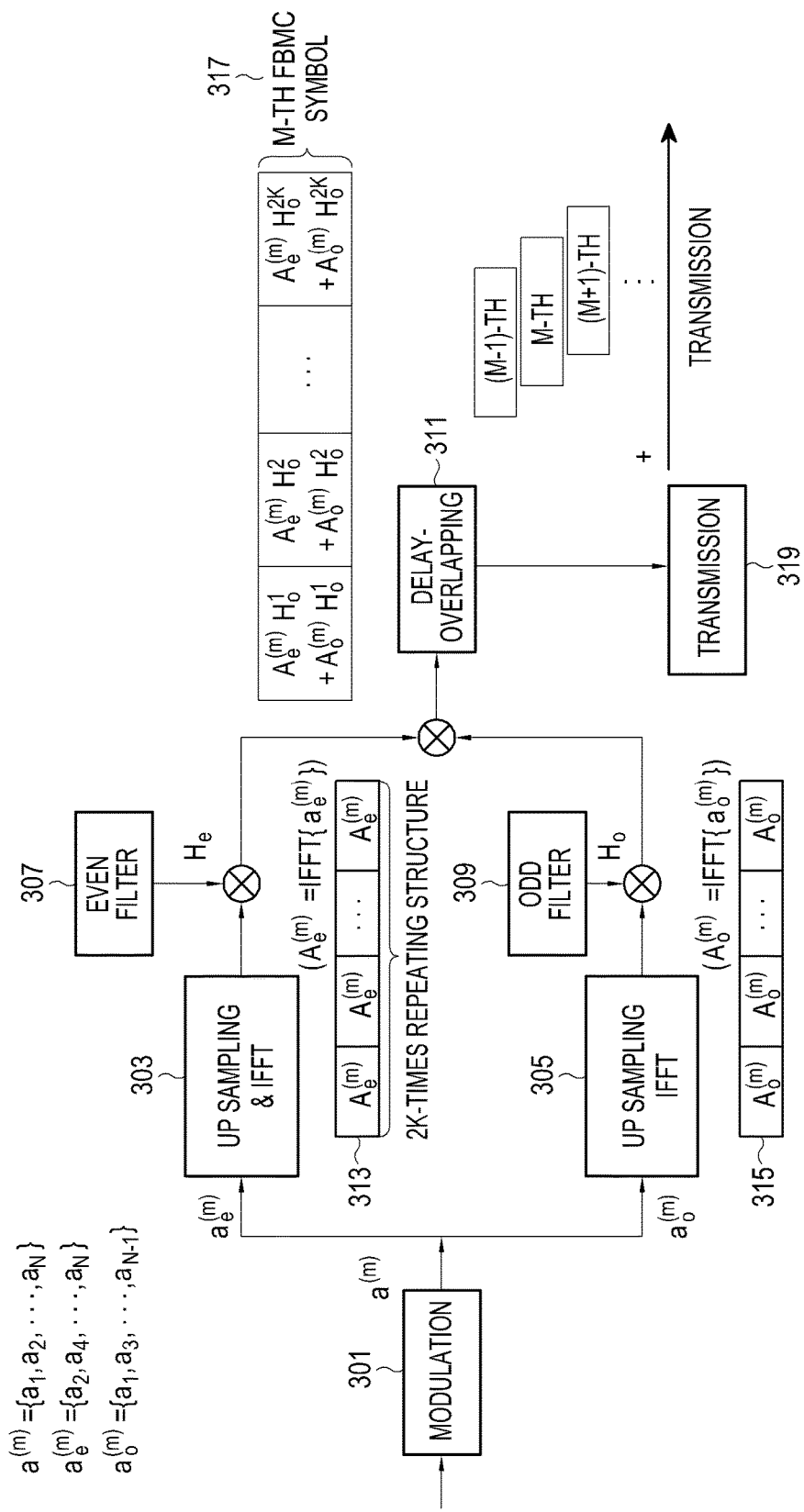
FIG. 3 illustrates a structure for transmitting symbols in an FBMC system.

FIG. 3 illustrates a structure for transmitting symbols in an FBMC system. The present disclosure proposes a method and apparatus for forming a repeating pattern without using a plurality of symbols. In other words, a description will be made of a structure in which a transmitter forms a repeating pattern with an arbitrary single symbol and a receiver uses the repeating pattern of the single symbol for synchronization acquisition. However, if multiple symbols are applied, better synchronization operating may be possible. Thus, obviously, the FBMC system may use multiple symbols, not a single symbol, for synchronization operating. Therefore, a description will be made of a synchronization operating method through symbol generation and acquisition of a repeating pattern in terms of an arbitrary single symbol (i.e., an m-th symbol) among a plurality of symbols.

A transmitting device based on the FBMC scheme (hereinafter, referred to as a 'transmitting device') may generate a training signal sequence ($a^{(m)}=\{a_1, a_2, a_3, \ldots, a_N\}$, where N is assumed to be an even number) including N training signals by performing modulation 301 for a training signal. The transmitting device may divide the training signal sequence into an odd-numbered part ($a_o^{(m)}=\{a_1, a_3, \ldots, a_{N-1}\}$) and an even-numbered part ($a_e^{(m)}=\{a_2, a_4, \ldots, a_N\}$). Hereinafter, the odd-numbered part of the training signal sequence will be referred to as an 'odd-numbered signal sequence' and the even-numbered part of the training signal sequence will be referred to as an 'even-numbered signal sequence'.

The transmitting device may up-sample K-fold each of the even-numbered and odd-numbered signal sequences ($a_e^{(m)}$, $a_o^{(m)}$), and then perform inverse fast Fourier transform (IFFT) 303 and 305 to generate even-numbered and odd-numbered transformed signal sequences ($a_e^{(m)}$, $A_o^{(m)}$). The even-numbered and odd-numbered transformed signal sequences may be signal sequences 313 and 315 in the form in which the same training signal sequences $A_e^{(m)}$ and $A_o^{(m)}$ are repeated 2K times, respectively. Here, $A_e^{(m)}$ represents an even-numbered transformed training signal of an m-th symbol, and $A_o^{(m)}$ represents an odd-numbered transformed training signal of the m-th symbol. Actually, the even-numbered transformed training signal $A_e^{(m)}$ may be configured in the form of a signal sequence such as $A_e^{(m)}=\{A_2, A_4, \ldots A_N\}$, and the odd-numbered transformed training signal $A_o^{(m)}$ may be configured in the form of a signal sequence such as $A_o^{(m)}=\{A_1, A_3, \ldots A_{N-1}\}$. Here, the up-sampling operation of K-fold may be an operation of increasing the sampling frequency, for example, K-fold.

The transmitting device may generate an even-numbered part (hereinafter, referred to as an 'even symbol') and an odd-numbered part (hereinafter, referred to as an 'odd symbol') for configuring an m-th symbol by multiplying the two transformed signal sequences by an even filter ($H_e$) 307 and an odd filter ($H_o$) 309 whose filter order is K, respectively. The even filter 307 means an FBMC filter to be applied to the even-numbered transformed signal sequence, and the odd filter 309 means an FBMC filter to be applied to the odd-numbered transformed signal sequence.

The transmitting device may generate an m-th training symbol 317 by summing the even symbol and the odd symbol.

Alternatively, the even filter and the odd filter may be multiplied by the training signal sequence prior to the IFFTs 303 and 305. In other words, the transmitting device may perform the up-sampling and IFFT operation after multiplying the odd-numbered signal sequence and the even-numbered signal sequence by the odd filter and the even filter, respectively.

The transmitting device may delay-overlap the generated m-th training symbol 317 together with other transmission symbols (see 311). Other symbols (e.g., an (m−1)-th symbol and an (m+1)-th symbol) that are delay-overlapped together with the m-th training symbol 317 may be training symbols or data symbols.

The transmitting device may transmit the generated transmission symbol (see 319).

Figure 4:
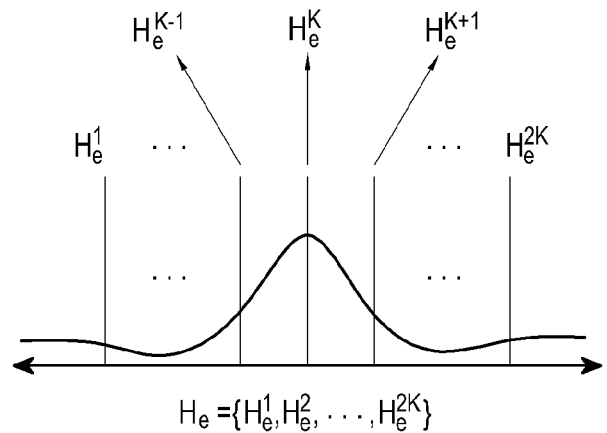
FIG. 4 illustrates an example in which a graph of an even filter in an FBMC filter is divided into intervals, the number of which corresponds to the number of times that a training signal is repeated in a transformed signal sequence.

FIG. 4 illustrates an example in which a graph of an even filter in an FBMC filter is divided into intervals, the number of which corresponds to the number 2K of times that a training signal $A_e^{(m)}$ is repeated in a transformed signal sequence.

Specifically, a filter whose filter order is K may include KN filter coefficients. The KN filter coefficients may be expressed as two filter sets $\{H_e=[H_e^1, H_e^2, \ldots, H_e^{2K}]\}$ and $\{H_o=[H_o^1, H_o^2, \ldots, H_o^{2K}]\}$, each of which includes 2K unit filter blocks. The two filter sets may be an even filter set and an odd filter set, respectively. FIG. 4 illustrates an even filter set.

Therefore, the m-th training symbol 317 may be expressed as a sum of a product of an even training signal sequence and an even filter set, and a product of an odd training signal sequence and an odd filter set, as shown in Equation (1) below.

$$[A_e^{(m)}H_e^1+A_o^{(m)}H_o^1, A_e^{(m)}H_e^2+A_o^{(m)}H_o^2, \ldots, A_e^{(m)}H_e^{2K}+A_o^{(m)}H_o^{2K}] \quad \text{Eq. (1)}$$

The signal that is actually transmitted from the transmitting device may be generated through a process in which the multiple symbols are delay-overlapped.

FIG. 5 illustrates a repeating pattern and inter-symbol interference in a case where one training symbol is delay-overlapped with data symbols during its transmission in an FBMC system.

Figures 5A, 5B:
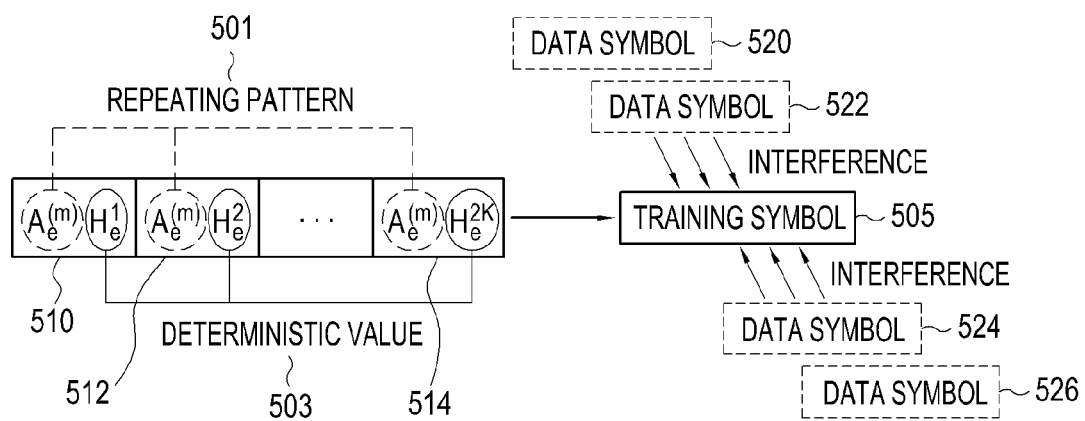
FIGS. 5A and 5B illustrate a repeating pattern and inter-symbol interference in a case where one training symbol is delay-overlapped with data symbols during its transmission in an FBMC system.

FIG. 5A illustrates an even symbol constituting an m-th training symbol in an FBMC system. One training symbol may be expressed as 2K signal blocks. One signal block may be expressed as a product of a transformed training signal and a filter block. Since a training signal $A_e^{(m)}$ included in each signal block is the same, signal blocks have a repeating pattern 501. However, as the same training signal is multiplied by filter blocks with different values, signal blocks 510, 512 and 514 constituting one training symbol may have different signal strengths. In other words, a deterministic value for determining signal strengths of the signal blocks constituting the symbol (e.g., largest value) may be filter coefficients 503 corresponding to the filter blocks.

FIG. 5B illustrates inter-symbol interference in a case where the training symbol and the data symbols are delay-overlapped during their transmission. In other words, a training symbol 505 transmitted between data symbols 520, 522, 524 and 526 requires consideration of the effects of interference, since inter-symbol interference (ISI) may be generated by the data symbols 520, 522, 524 and 526. When a training symbol for synchronization estimation is delay-overlapped during its transmission, the training symbol may be interfered by other symbols (e.g., data symbols) in multiple intervals (e.g., signal blocks). Therefore, a receiving device that desires to perform synchronization operating should window, as a training interval, the signal block that is least affected by the inter-symbol interference, to achieve the excellent synchronization operating performance.

Figure 6:
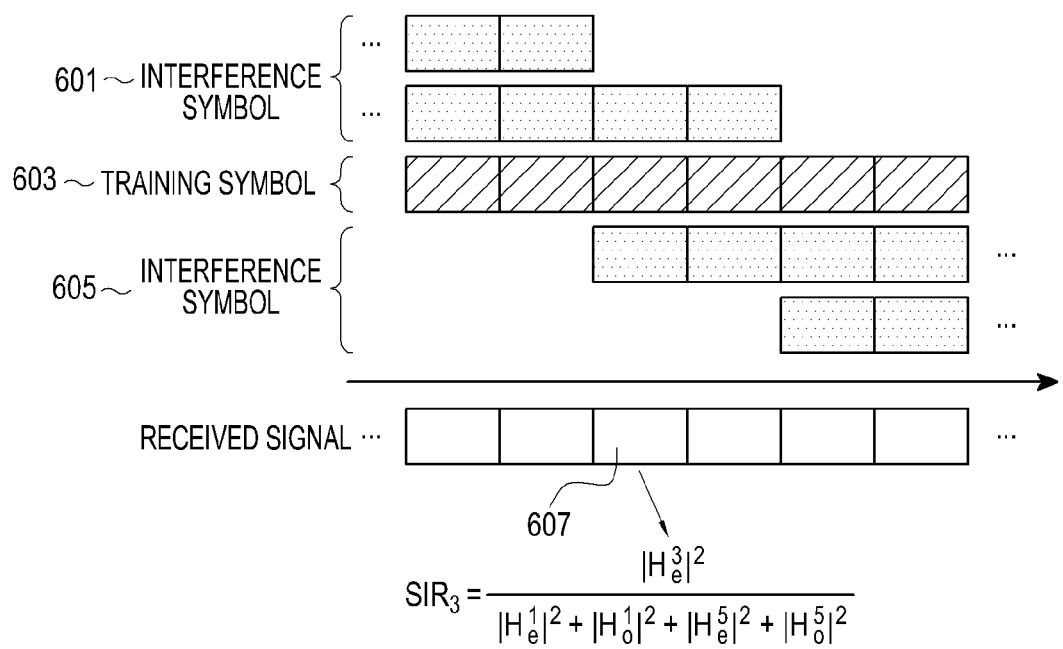
FIG. 6 illustrates a structure in which when an order K of an FBMC filter is 3 (K=3), a training symbol is delay-overlapped with other data symbols during its transmission.

FIG. 6 illustrates a structure in which when an order K of an FBMC filter is 3 (K=3), a training symbol is delay-overlapped with other data symbols during its transmission. In the case illustrated in FIG. 6, an arbitrary transmission symbol is delay-overlapped by two signal blocks compared with a previous transmission symbol. Other symbols 601 and 605, which are transmitted earlier than a training symbol 603 or delay-transmitted compared with the training symbol 603, may act as interference to the training symbol 603.

In one embodiment of the present disclosure, a windowing method of determining, as a training interval, an interval that is least affected by the effect of interference during the delay-overlapped transmission, may determine, as a training interval for synchronization estimation, a signal block which is greater than the interference signal in terms of the level of transmission power of the training signal. For example, an FBMC transmitting device or an FBMC receiving device may calculate a signal-to-interference ratio (SIR) with respect to a training signal of each signal block, and determine a training interval based on the calculated SIR value (e.g., largest value).

Training signals in each of signal blocks are all the same in terms of the signal strength, as shown in Equation (2) below.

$$|A_e^{(m)}|=|A_o^{(m)}|, |A_e^{(m)}|=|A_e^{(m+1)}|, |A_o^{(m)}|=|A_o^{(m+1)}| \text{ for all } m \quad \text{Eq. (2)}$$

Therefore, signal strength of signal blocks constituting a training symbol may be determined by filter blocks, and SIRi of an i-th signal block can be expressed by a value of a filter block for each signal block as shown in Equation (3).

$$SIR_i = \begin{cases} \dfrac{|H_e^i|^2}{\sum_{j=1, i\neq 2j-1}^{j=K}\left(|H_e^{2j-1}|^2+|H_o^{2j-1}|^2\right)}, & i = \text{odd} \\ \dfrac{|H_e^i|^2}{\sum_{j=1, i\neq 2j}^{j=K}\left(|H_e^{2j}|^2+|H_o^{2j}|^2\right)}, & i = \text{even} \end{cases} \quad \text{Eq. (3)}$$

The reason for summing j up to only K is that since the filter shows a symmetrical distribution, the result obtained by calculating SIR by performing summation only up to K is the same as the result of the remaining interval (j=K+1, ..., 2K). In addition, the reason why a denominator of Equation (3) has a value of only the even-numbered filter block is that a training signal is assumed to be transmitted only in the even-numbered signal sequence. The training signal may be transmitted only in any one of an even-numbered signal sequence and an odd-numbered signal sequence. Further, '0' may be transmitted in the remaining signal sequence that is not used for transmission of the training signal. However, a data symbol may be transmitted in both of the even-numbered signal sequence and the odd-numbered signal sequence.

In a case where the filter order K is 3 as in FIG. 6, SIR (i.e., SIR3) of, for example, a third signal block 607 may be calculated as shown in Equation (4).

$$SIR_3 = \frac{|H_e^3|^2}{|H_e^1|^2+|H_o^1|^2+|H_o^5|^2+|H_e^5|^2}. \quad \text{Eq. (4)}$$

If SIRs of all signal blocks are calculated according to a given filter, the FBMC transmitting device or the FBMC receiving device may window, as a training interval, two intervals having the highest SIR among a total of 2K symbol intervals. Specifically, the FBMC transmitting device or the FBMC receiving device may determine, as one training interval, an i-th interval (where 1≤i≤K) having the highest SIR, and determine another i-th training interval (where K+1≤i≤2K) so as to correspond to the determined i-th interval.

Signal blocks corresponding to the two windowed training intervals may have signal waveforms that are not the same by filter blocks having different values, which are multiplied by training signals included in the signal blocks. Therefore, in order for the windowed training intervals to have a repeating signal waveform (or the same signal waveform), the FBMC transmitting device or the FBMC receiving device may perform a mirror filtering operation.

Alternatively, the FBMC transmitting device or the FBMC receiving device may determine the block to be windowed, by comparing only the sizes of the filter blocks that are multiplied by signal blocks, without calculating the SIR value by Equation (3). In this case, the FBMC transmitting device or the FBMC receiving device may determine, as a block to be windowed, a signal block, the size of its associated filter block is the largest.

Figure 7:
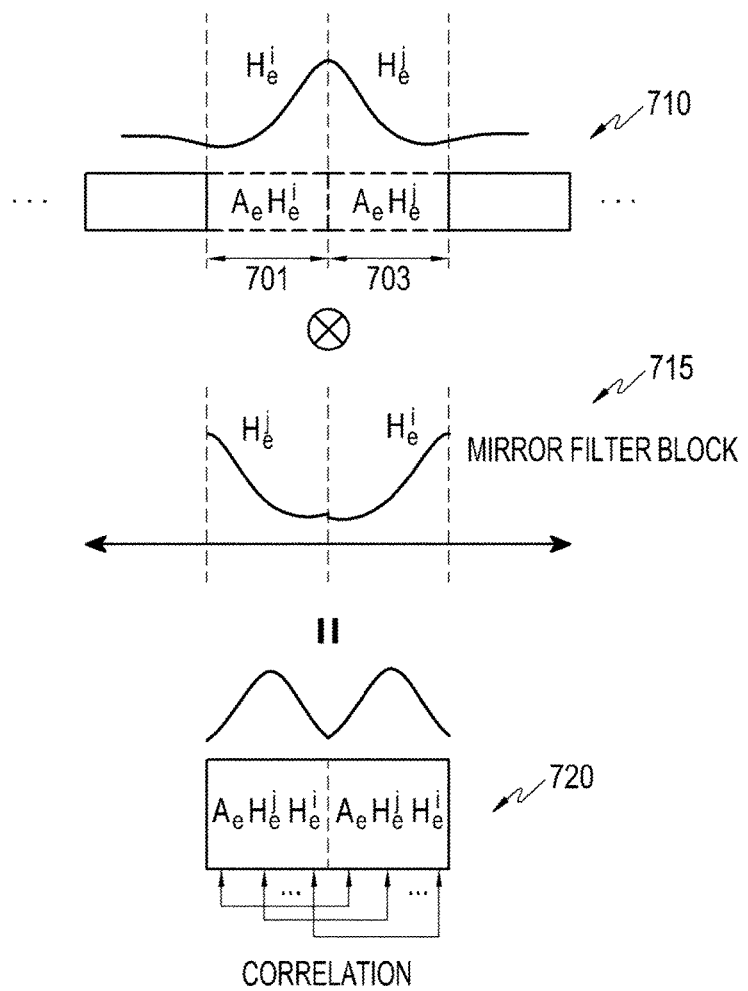
FIG. 7 illustrates a mirror filtering process for making a repeating signal waveform for a windowed synchronization interval according to an embodiment of the present disclosure.

FIG. 7 illustrates a mirror filtering process for making a repeating signal waveform for a windowed synchronization interval according to an embodiment of the present disclosure. Signal blocks corresponding to the two windowed training intervals 701 and 703 may not have the same signal waveform (see 710), since the signal blocks are the same in terms of the signal strength of the training signals, but are different from each other in terms of the values of the filter blocks. Therefore, the FBMC transmitting device or the FBMC receiving device may perform an operation (i.e., mirror filtering processing) of exchanging filter blocks that are multiplied by signals blocks corresponding to the two training intervals, and then multiplying the filter blocks by the signals blocks.

For example, when an i-th signal block 701 and a j-th signal block 703 of a training symbol are windowed as a training interval, the signal blocks 701 and 703 are assumed to be multiplied by filter blocks $H_e^i$ and $H_e^j$, respectively. In this case, a mirror filtering operation of the FBMC transmitting device or the FBMC receiving device is to multiply the i-th block 701 and the j-th block 703 by mirror filter blocks $H_e^i$ and $H_e^j$, respectively (see 715), and may be expressed as Equation (5) below.

$$\text{Windowing block} \times \text{Mirror filter block} = \quad \text{Eq. (5)}$$
$$[A_e^{(m)}H_e^i, A_e^{(m)}H_e^j] \times [H_e^j, H_e^i] = [A_e^{(m)}H_e^iH_e^j, A_e^{(m)}H_e^jH_e^i]$$

The mirror filter block that is multiplied by the first signal block 701 for mirror filtering may be a filter block that is multiplied by the second signal block 703 in a training symbol generation process, and the mirror filter block that is multiplied by the second signal block 703 may be a filter block that is multiplied by the first signal block 701 in the training symbol generation process.

If the mirror filtering based on Equation (5) is applied to the windowed training intervals 701 and 703, the same signal waveform may be formed in the training intervals 701 and 703 (see 720). Therefore, the FBMC receiving device may apply a synchronization operating scheme that uses the repeated structure, such as the correlation comparison method, to the training interval having the same signal waveform.

Figure 8:
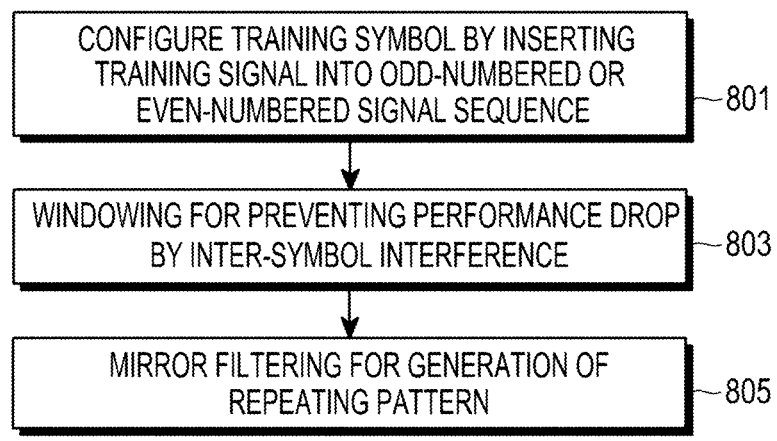
FIG. 8 schematically illustrates a synchronization operating method that can be performed in a transmitting device or a receiving device using the FBMC symbol characteristics according to an embodiment of the present disclosure.

FIG. 8 schematically illustrates a synchronization operating method that can be performed in a transmitting device or a receiving device using the FBMC symbol characteristics according to an embodiment of the present disclosure. In operation 801, a transmitting device may generate a training symbol by inserting training signals into an odd-numbered or even-numbered signal sequence in order to configure an FBMC training symbol. For example, the operation of inserting training signals into an odd-numbered or even-numbered signal sequence may be implemented by an operation of loading the training signals on an odd-numbered or even-numbered subcarrier.

The generated training symbol is delay-overlapped with data symbols during its transmission, so inter-symbol interference may occur. In operation 803, in order to prevent a drop in performance by the inter-symbol interference, the transmitting device or the receiving device may perform windowing of selecting, as a training interval, a signal block with high SIR among a plurality of signal blocks constituting one training symbol. For example, if signal strengths of training signals included in signal blocks are the same, since the signal strengths of signal blocks are influenced by the filter blocks that are multiplied by the signal blocks, the transmitting device or the receiving device may perform windowing of selecting a signal block(s) having the greatest SIR value that is determined using a value of the filter block.

In operation 805, the transmitting device or the receiving device may perform mirror filtering to generate a repeating pattern for the windowed block (i.e., the training interval). Specifically, the transmitting device or the receiving device may generate a repeating pattern in the training interval by exchanging filter blocks that are multiplied by two signal blocks corresponding to the training interval, and then further multiplying the filter blocks by the two signal blocks.

At least one or both of operations 803 and 805 may be performed in any of the transmitting device or the receiving device, and a description thereof will be made in connection with FIGS. 9 and 10.

Figure 9:
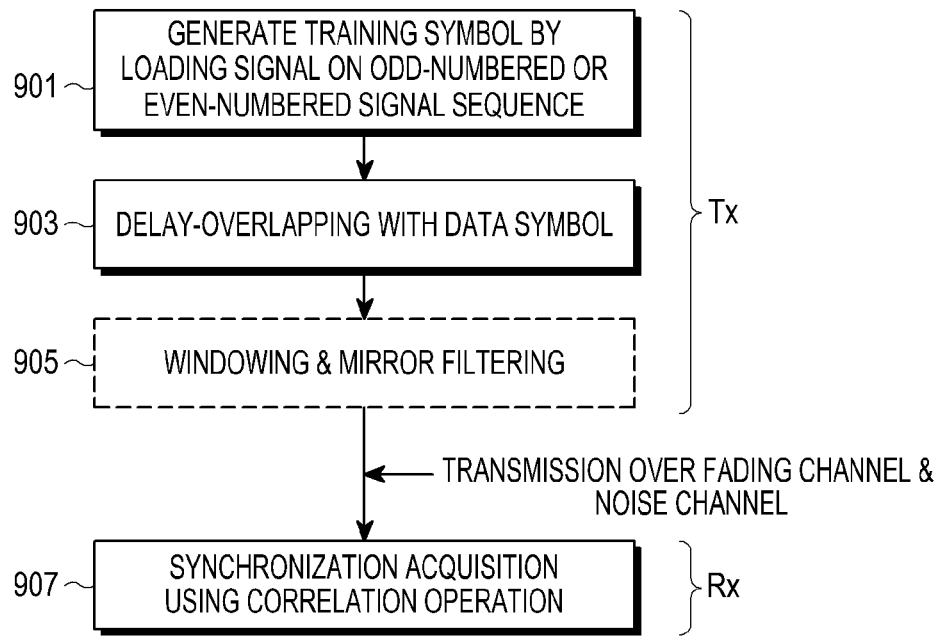
FIG. 9 illustrates a pre-filtering method for processing windowing and mirror filtering for synchronization operating in a transmitting device according to an embodiment of the present disclosure.

FIG. 9 illustrates a pre-filtering method for processing windowing and mirror filtering for synchronization operating in a transmitting device according to an embodiment of the present disclosure. Operations 901 and 903 correspond to operation 801 in FIG. 8, and operation 905 corresponds to operations 803 and 805 in FIG. 8.

The transmitting device may pre-process windowing and mirror filtering for a training symbol, and then transmit the results to the receiving device. In the transmission process, a transmission channel may undergo fading, and may be affected by a noise channel.

In operation 907, the receiving device may receive the training symbol for which windowing and mirror filtering is pre-processed, and calculate a correlation for the training symbol to acquire synchronization. Specifically, the receiving device may determine a synchronization point (or time) through the calculation of a correlation, and perform synchronization using the determined synchronization point.

Pre-processing windowing and mirror filtering in a transmitter may be advantageous in that the low complexity of a receiver (generally, a user equipment) can be maintained, since the calculation of a correlation is applied in the transmitter. On the other hand, in the pre-filtering scheme, since a mirror filter is multiplied prior to transmission of a transmission symbol, a change in shape of the FBMC filter may occur, and the synchronization performance may be degraded due to occurrence of interference caused by the change in the filter shape.

Figure 10:
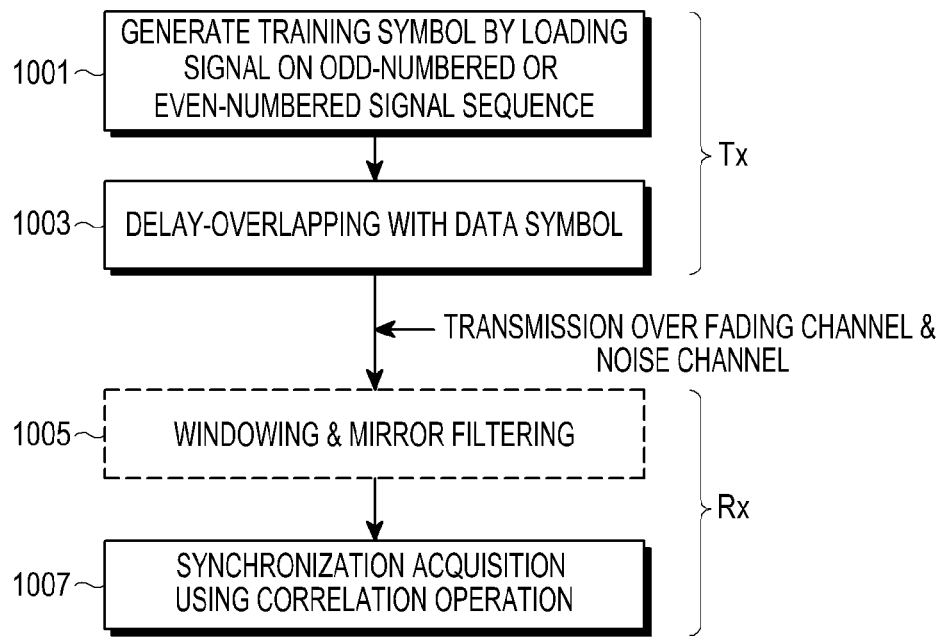
FIG. 10 illustrates a post-filtering method for processing windowing and mirror filtering for synchronization operating in a receiving device according to an embodiment of the present disclosure.

FIG. 10 illustrates a post-filtering method for processing windowing and mirror filtering for synchronization operating in a receiving device according to an embodiment of the present disclosure. Operations 1001, 1003, 1005 and 1007 are matched to operations 901, 903, 905 and 907 in FIG. 9, respectively. However, an entity performing operation 1005 is a receiver. Therefore, the receiver may process windowing and mirror filtering with respect to a received training symbol, and calculate a correlation for the processed training symbol to acquire synchronization.

The post-filtering method in which the receiver post-processes windowing and mirror filtering in this way may somewhat increase the implementation complexity of the receiver since the mirror filtering operation is implemented in the receiver (generally, a user equipment). However, the post-filtering method may be robust against interference since a change in shape of the FBMC filter does not occur, thereby contributing to the improvement of the synchronization performance.

Figure 11:
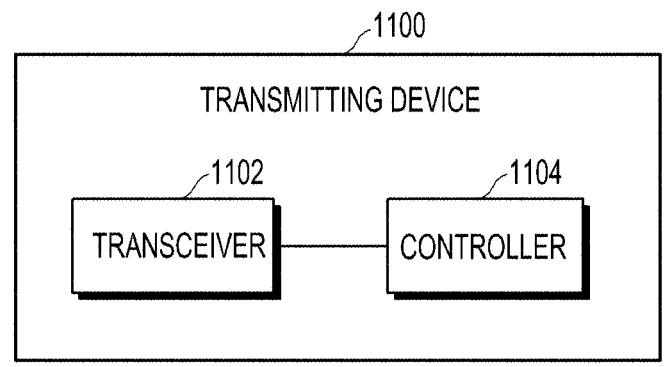
FIG. 11 illustrates a structure of a transmitting device according to an embodiment of the present disclosure.

FIG. 11 illustrates a structure of a transmitting device according to an embodiment of the present disclosure. A transmitting device 1100 according to an embodiment of the present disclosure is a device that transmits a training symbol in accordance with the FBMC scheme, and the transmitting device 1100 may be a base station device, an evolved Node B (eNB) device, an Access Point (AP) device or a user equipment of the cellular system.

The transmitting device 1100 may include a transceiver 1102 for transmitting and receiving signals to/from a receiving device, and a controller 1104 for controlling the transceiver 1102. It may be construed that the controller 1104 controls all of the operations described herein to be performed by the transmitting device or the transmitter. Although the transceiver 1102 and the controller 1104 are illustrated as separate components in FIG. 11, the transceiver 1102 and the controller 1104 may be implemented as one component.

Figure 12:
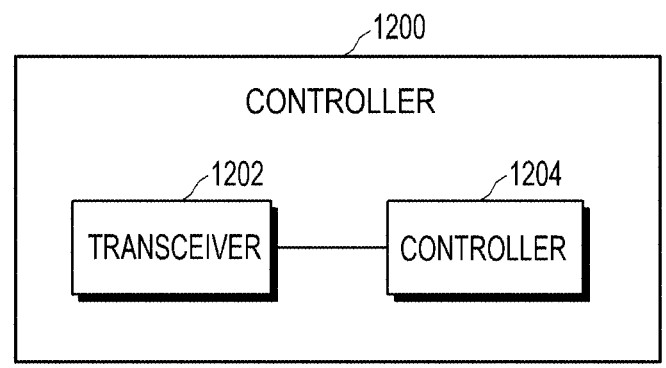
FIG. 12 illustrates a structure of a receiving device according to an embodiment of the present disclosure.

FIG. 12 illustrates a structure of a receiving device according to an embodiment of the present disclosure. A receiving device 1200 according to an embodiment of the present disclosure is a device that acquires synchronization by receiving a training symbol in accordance with the FBMC scheme, and the receiving device 1200 may be a user equipment of the cellular system.

The receiving device 1200 may include a transceiver 1202 for transmitting and receiving signals to/from a transmitting device, and a controller 1204 for controlling the transceiver 1202. It may be construed that the controller 1204 controls all of the operations described herein to be performed by the receiving device or the receiver. Although the transceiver 1202 and the controller 1204 are illustrated as separate components in FIG. 12, the transceiver 1202 and the controller 1204 may be implemented as one component.

Figure 13:
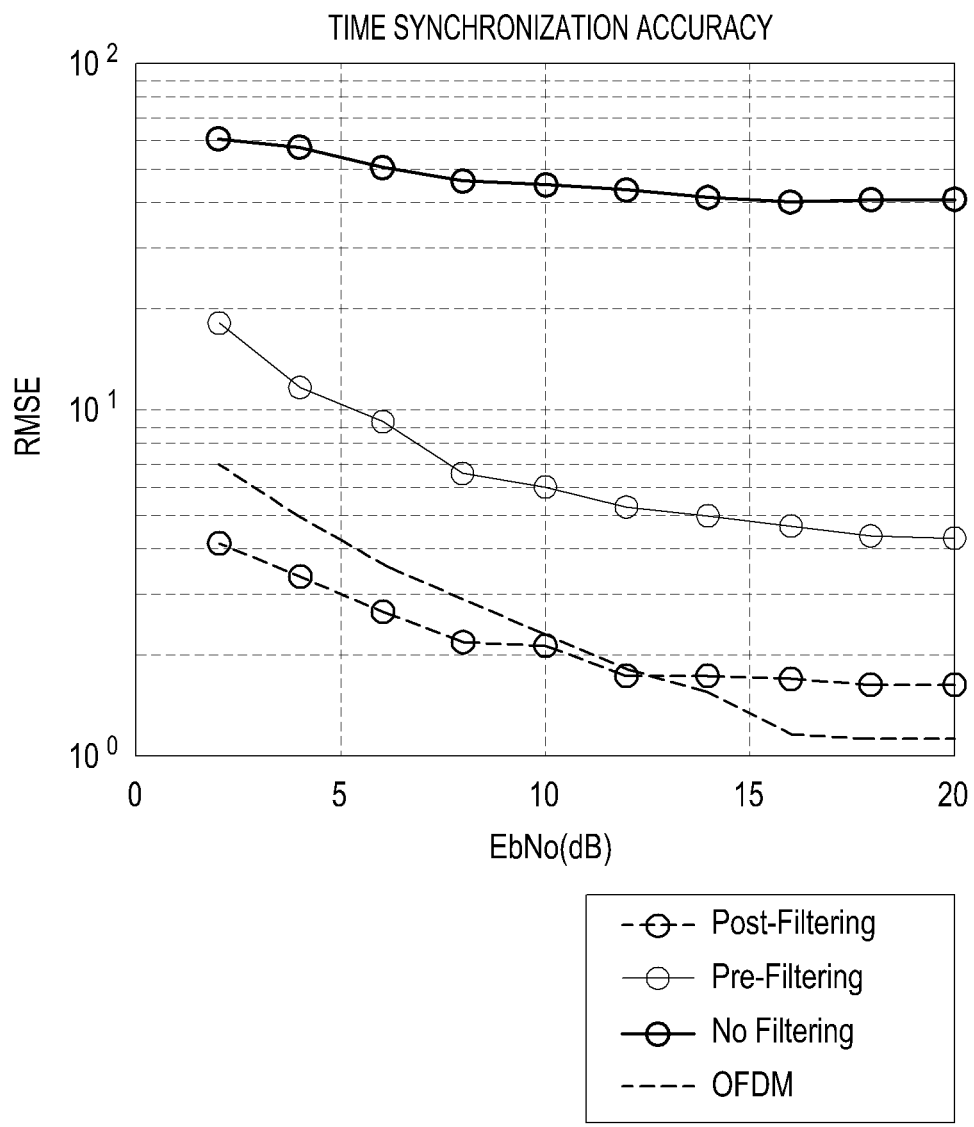
FIG. 13 illustrates the simulation results for the time synchronization accuracy of a channel with a white Gaussian noise.

FIG. 13 illustrates the simulation results for the time synchronization accuracy of a channel with a white Gaussian noise. The target of simulation may include a case where a transmitter processes windowing and mirror filtering, a case where a receiver processes windowing and mirror filtering, a case where any of the transmitter and the receiver does not process windowing and mirror filtering, and a case of the OFDM system.

The case in which windowing and mirror filtering are part of the process may have conditions where an order K of the FBMC filter is 4, the IFFT size is 1024, and a physical layer for dynamic spectrum access and cognitive radio (Phydyas) filter is used as an even filter. The OFDM system, which is a control group, may have conditions that a non-overlapping preamble is used and a length of a cyclic prefix is ⅛ of a symbol length. The simulation results may be evaluated as a root mean square error (RMSE) based on energy per bit to noise density (EbNo).

It can be noted from the simulation results that the synchronization performance is improved as EbNo increases, the scheme (i.e., the post-filtering scheme) of processing windowing and mirror filtering in the receiver has the best performance, and the scheme in which any of the transmitter and the receiver processes windowing and mirror filtering has the worst performance.

Figure 14:
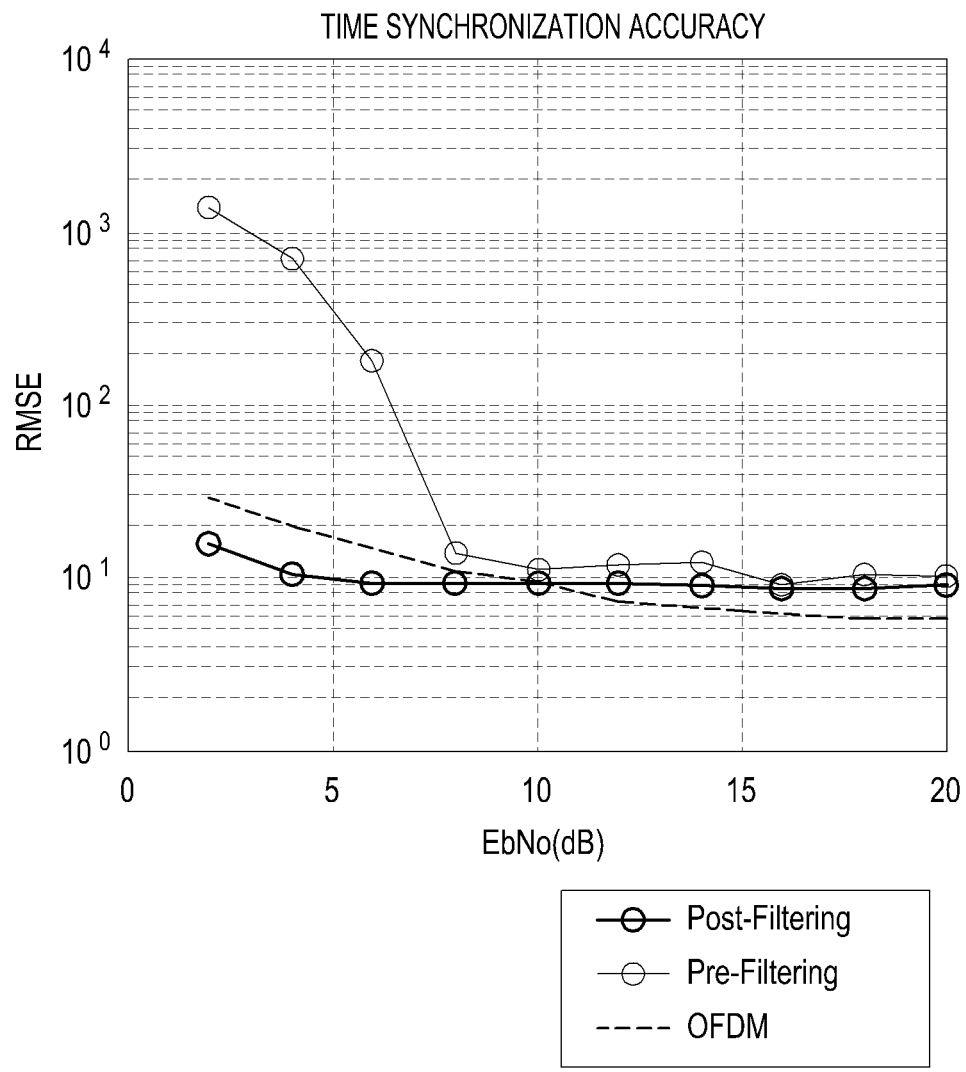
FIG. 14 illustrates the simulation results for the time synchronization accuracy in a moving object.

FIG. 14 illustrates the simulation results for the time synchronization accuracy in a moving object. However, the conditions and target of the simulation are the same as those in FIG. 13, except for the scheme in which the simulation target does not perform windowing and mirror filtering.

In a case where a transmitter processes windowing and mirror filtering, when EbNo is low, the performance may be somewhat degraded compared with the OFDM scheme. However, in a case where a receiver processes windowing and mirror filtering, the performance may be uniform as a whole, so this scheme (i.e., the post-filtering scheme) may be robust even in the frequency selective environment. As a result, even the embodiment proposed in the present disclosure may have the similar performance to the time synchronization accuracy of the OFDM system.

It should be noted that the illustration of the symbol transmission structure of the FBMC system illustrated in FIGS. 3 to 12, the graph of an even filter, the illustration of the signal sequence structure of an even symbol and the interference between transmission symbols, the illustration of a training interval based on mirror filtering, the illustration of a training symbol transmitting or receiving method of a transmitting device or a receiving device, and the illustration of the structure of the transmitting device or the receiving device are not intended to limit the scope of the present disclosure. In other words, all components or operations described in FIGS. 3 to 12 should not be construed as prerequisites for implementation of the present disclosure, and the subject matter of the present disclosure may be implemented with only some of the components or operations.

The above-described operations may be implemented by mounting or installing a memory device storing a corresponding program code in a base station of a communication system, or in an arbitrary component of a user equipment. In other words, a controller of the base station or the user equipment may execute above-described operations by reading out and executing the program code stored in the memory device by means of a processor or a central processing unit (CPU).

The above-described various components and modules of the base station or the user equipment may be operated using a hardware circuit, for example, a hardware circuit such as a combination of a complementary metal oxide semiconductor (CMOS)-based logic circuit, firmware, software and/or hardware and firmware, and/or software inserted in a machine-readable medium. For example, various electrical structures and methods may be implemented using electrical circuits such as transistors, logic gates and application specific integrated circuits (ASICs).

As is apparent from the foregoing description, the FBMC system according to an embodiment of the present disclosure may employ the synchronization operating scheme of the OFDM system without using a plurality of training symbols. Therefore, the FBMC scheme may efficiently use the resources while obtaining the same effects, compared with the conventional scheme.

In other words, the FBMC system according to an embodiment of the present disclosure, even though it uses the limited resources, may have almost same performance as that of the OFDM-based synchronization operating scheme, and may ensure the robust synchronization performance even in the multi-path channel.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for transmitting a transmission symbol by a communication device, the method comprising:
   up-sampling a modulated training signal sequence to generate an up-sampled sequence;
   performing inverse fast Fourier transform (IFFT) on the up-sampled sequence to generate a transformed signal sequence comprising an odd-numbered transformed signal sequence and an even-numbered transformed signal sequence, wherein each sequence comprises symbols;
   multiplying each symbol of the odd-numbered transformed signal sequence with a corresponding predetermined odd-numbered filter coefficient to generate odd-numbered signal blocks;
   multiplying each symbol of the even-numbered transformed signal sequence with a corresponding predetermined even-numbered filter coefficient to generate even-numbered signal blocks;
   generating a training symbol comprising a plurality of signal blocks by combining the odd-numbered signal blocks and the even-numbered signal blocks;
   selecting a first signal block and a second signal block for synchronization estimation from among the plurality of signal blocks in the training symbol;
   mirror-filtering the first and second signal blocks by:
      multiplying the first signal block by a second filter coefficient that was multiplied to the transformed signal sequence corresponding to the second signal block; and
      multiplying the second signal block by a first filter coefficient that was multiplied to the transformed signal sequence corresponding to the first signal block;
   generating a transmission symbol based on the mirror-filtered first and second signal blocks; and
   transmitting the transmission symbol to another communication device,
   wherein the transmission symbol is used for synchronization with the communication device by the another communication device.

2. The method of claim 1, wherein the odd-numbered filter coefficient and the even-numbered filter coefficient are determined for a filter bank multicarrier (FBMC) transmission.

3. The method of claim 1, wherein the first and second signal blocks have highest signal to interference ratio (SIR) values among the plurality of signal blocks in the training symbol.

4. A synchronization method that uses a transmission symbol by a communication device, the method comprising:
   receiving the transmission symbol from another communication device;
   performing synchronization between the communication device and the another communication device based on the received transmission symbol,
   wherein:
      the transmission symbol is generated by the another communication device by:
         up-sampling a modulated training signal sequence to generate an up-sampled sequence;
         performing inverse fast Fourier transform (IFFT) on the up-sampled sequence to generate a transformed signal sequence comprising an odd-numbered transformed signal sequence and an even-numbered transformed signal sequence, wherein each sequence comprises symbols;
         multiplying each symbol of the odd-numbered transformed signal sequence with a corresponding predetermined odd-numbered filter coefficient to generate odd-numbered signal blocks;
         multiplying each symbol of the even-numbered transformed signal sequence with a corresponding predetermined even-numbered filter coefficient to generate even-numbered signal blocks;
         generating a training symbol comprising a plurality of signal blocks by combining the odd-numbered signal blocks and the even-numbered signal blocks;
         selecting a first signal block and a second signal block for synchronization estimation from among the plurality of signal blocks in the training symbol;
         mirror-filtering the first and second signal blocks by:
            multiplying the first signal block by a second filter coefficient that was multiplied to transformed signal sequence corresponding to the second signal block, and
            multiplying the second signal block by a first filter coefficient that was multiplied to transformed signal sequence corresponding to the first signal block;
         generating the transmission symbol based on the mirror-filtered first and second signal blocks; and
      the transmission symbol is transmitted by the another communication device to the communication device.

5. The synchronization method of claim 4, wherein the odd-numbered filter coefficient and the even-numbered filter coefficient are determined for filter bank multicarrier (FBMC) transmission.

6. The synchronization method of claim 4, wherein the first and second signal blocks have highest signal to interference ratio (SIR) values among the plurality of signal blocks in the training symbol.

7. A communication device to transmit a transmission symbol, comprising:
   a controller configured to:
      up-sample a modulated training signal sequence to generate an up-sampled sequence;
      perform inverse fast Fourier transform (IFFT) on the up-sampled sequence to generate a transformed signal sequence comprising an odd-numbered transformed signal sequence and an even-numbered transformed signal sequence, wherein each sequence comprises symbols;
      multiply each symbol of the odd-numbered transformed signal sequence with a corresponding predetermined odd-numbered filter coefficient to generate odd-numbered signal blocks;
      multiply each symbol of the even-numbered transformed signal sequence with a corresponding predetermined even-numbered filter coefficient to generate even-numbered signal blocks;
      generate a training symbol comprising a plurality of signal blocks by combining the odd-numbered signal blocks and the even-numbered signal blocks;
      select a first signal block and a second signal block for synchronization estimation from among the plurality of signal blocks in the training symbol;

mirror-filter the first and the second signal blocks by:
  multiplying the first signal block by a second filter coefficient that was multiplied to the transformed signal sequence corresponding to the second signal block; and
  multiplying the second signal block by a first filter coefficient that was multiplied to the transformed signal sequence corresponding to the first signal block; and
generate a transmission symbol based on the mirror-filtered first and second signal blocks; and
a transceiver configured to transmit the transmission symbol to another communication device,
wherein the transmission symbol is used for synchronization with the communication device by the another communication device.

8. The communication device of claim 7, wherein the odd-numbered filter coefficients and the even-numbered filter coefficients are determined for a filter bank multi carrier (FBMC) transmission.

9. The communication device of claim 7, wherein the first and second signal blocks have highest signal to interference ratio (SIR) values among the plurality of signal blocks in the training symbol.

10. A communication device configured to receive a transmission symbol, comprising:
a transceiver configured to receive the transmission symbol from another communication device; and
a controller configured to:
  perform synchronization between the communication device and the another communication device based on the received transmission symbol,
wherein:
  the transmission symbol is generated in the another communication device by:
    up-sampling a modulated training signal sequence to generate an up-sampled sequence;
    performing inverse fast Fourier transform (IFFT) on the up-sampled sequence to generate a transformed signal sequence comprising an odd-numbered transformed signal sequence and an even-numbered transformed signal sequence, wherein each sequence comprises symbols;
    multiplying each symbol of the odd-numbered transformed signal sequence with a corresponding predetermined odd-numbered filter coefficient to generate odd-numbered signal blocks;
    multiplying each symbol of the even-numbered transformed signal sequence with a corresponding predetermined even-numbered filter coefficient to generate even-numbered signal blocks;
    generating a training symbol comprising a plurality of signal blocks by combining the odd-numbered signal blocks and the even-numbered signal blocks;
    selecting a first signal block and a second signal block for synchronization estimation from among the plurality of signal blocks in the training symbol;
    mirror-filtering the first and second signal blocks by:
      multiplying the first signal block by a second filter coefficient that was multiplied to transformed signal sequence corresponding to the second signal block, and
      multiplying the second signal block by a first filter coefficient that was multiplied to transformed signal sequence corresponding to the first signal block; and
    generating the transmission symbol based on the mirror-filtered first and second signal blocks; and
  the transmission symbol is transmitted by the another communication device to the communication device.

11. The communication device of claim 10, wherein the odd-numbered filter coefficient and the even-numbered filter coefficient are determined for filter bank multicarrier (FBMC) transmission.

12. The communication device of claim 10, wherein the first and second signal blocks have highest signal to interference ratio (SIR) values among the plurality of signal blocks in the training symbol.

* * * * *